United States Patent
Wang et al.

(10) Patent No.: US 10,649,904 B2
(45) Date of Patent: May 12, 2020

(54) SYSTEM AND METHOD FOR STORE STREAMING DETECTION AND HANDLING

(71) Applicant: Samsung Electronics Co., Ltd., Suwon-si, Gyeonggi-do (KR)

(72) Inventors: Hao Wang, Austin, TX (US); Dilip Muthukrishnan, Austin, TX (US); Brian C. Grayson, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 274 days.

(21) Appl. No.: 15/422,442

(22) Filed: Feb. 1, 2017

(65) Prior Publication Data

US 2018/0165211 A1  Jun. 14, 2018

Related U.S. Application Data

(60) Provisional application No. 62/433,232, filed on Dec. 12, 2016.

(51) Int. Cl.
 *G06F 12/0875* (2016.01)
 *G06F 12/0888* (2016.01)
 *G06F 12/0897* (2016.01)

(52) U.S. Cl.
 CPC ...... *G06F 12/0875* (2013.01); *G06F 12/0888* (2013.01); *G06F 12/0897* (2013.01); *G06F 2212/202* (2013.01); *G06F 2212/502* (2013.01)

(58) Field of Classification Search
 CPC ............. G06F 12/0875; G06F 12/0888; G06F 12/0897; G06F 2212/202; G06F 2212/502; G06F 9/30072; G06F 9/30181; G06F 9/3857
 See application file for complete search history.

(56) References Cited

U.S. PATENT DOCUMENTS

| | | | | |
|---|---|---|---|---|
| 5,590,292 A | * | 12/1996 | Wooten | G06F 13/4022 370/419 |
| 5,781,926 A | * | 7/1998 | Gaskins | G06F 12/0859 711/144 |
| 7,958,317 B2 | | 6/2011 | Speight et al. | |
| 8,595,596 B2 | | 11/2013 | Grube et al. | |
| 8,667,221 B2 | | 3/2014 | Kim et al. | |
| 8,667,225 B2 | | 3/2014 | Sander et al. | |
| 2007/0055824 A1 | * | 3/2007 | Diefendorff | G06F 12/0862 711/137 |
| 2008/0229009 A1 | * | 9/2008 | Gaither | G06F 12/0811 711/113 |
| 2009/0083490 A1 | * | 3/2009 | Berger | G06F 12/084 711/130 |
| 2011/0072214 A1 | * | 3/2011 | Li | G06F 12/0848 711/124 |

* cited by examiner

*Primary Examiner* — Larry T Mackall
(74) *Attorney, Agent, or Firm* — Renaissance IP Law Group LLP

(57) ABSTRACT

According to one general aspect, an apparatus may include a load/store circuit and a region size detection circuit. The load/store circuit may be configured to issue a plurality of store instructions to store data in a memory system. The region size detection circuit may be configured to determine a cache from a plurality of caches to store a stream of store instructions based upon, at least in part, by tracking multiple cache-line address entries in the plurality of store instructions, wherein each address entry is updated at a different frequency.

20 Claims, 6 Drawing Sheets

SYSTEM AND METHOD FOR STORE STREAMING DETECTION AND HANDLING

CROSS-REFERENCE TO RELATED APPLICATION

This application claims priority under 35 U.S.C. § 119 to Provisional Patent Application Ser. No. 62/433,232, entitled "SYSTEM AND METHOD FOR STORE STREAMING DETECTION AND HANDLING" filed on Dec. 12, 2016. The subject matter of this earlier filed application is hereby incorporated by reference.

TECHNICAL FIELD

The present disclosure generally relates to microprocessors, and more specifically to a system and method for store streaming detection and handling.

BACKGROUND

Streaming data in the context of a processor (CPU) is generally a sequence of store or write instructions that write data to consecutive or contiguous memory locations in virtual space. Often a large block of data will be moved or stored to memory via a series of write or store operations. A typical example of a streaming data or "store streaming" is a "memory copy", which is a commonly used method that copies a block of memory from a source location to a destination location. In hardware, this method translates to a stream of loads or read operations fetching data from the source location, followed by a stream of stores or write operations that copy the loaded data to the destination location. Some applications may simply utilize store streaming to initialize a large block of memory.

At times, these store streams are non-temporal. That is the data is often referenced only once and then not reused in the immediate future. For example, a typical memory copy operation may involve moving several kilobytes or megabytes of data that may only be referenced once during program execution. Caching the store data within the processor's caches (e.g., a level 2 (L2) cache, a level 1 (L1) cache, and a level 3 (L3) cache) can displace other useful cache-resident data, and be detrimental to performance.

Often, to avoid cache pollution, applications may attempt to provide an indication (e.g., through an instruction operation code, and a memory type) to enable the hardware to know that the streamed data is not to be cached. However there may be instances when the indication is not available within the instruction set. To address such concerns, many hardware designs incorporate a mechanism to dynamically detect the pattern of stores, and look for the case of store streaming patterns of large sizes (in order to stream them directly to system memory).

Using the above approach of hardware store streaming detection tends to avoid the general problem of cache pollution. However some applications (e.g., compilers, and so on) tend to temporally re-access store streams of reasonably large sizes that would otherwise fit within L2 or L3 caches. For such applications, caching would have been more beneficial. However, using the traditional hardware detection approach, those store streams would be written to memory repeatedly, incurring system memory bandwidth and power usage, and foregoing the benefits of cache storage.

SUMMARY

According to one general aspect, an apparatus may include a load/store circuit and a region size detection circuit. The load/store circuit may be configured to issue a plurality of store instructions to store data in a memory system. The region size detection circuit may be configured to determine a cache from a plurality of caches to store a stream of store instructions based upon, at least in part, by tracking multiple cache-line address entries in the plurality of store instructions, wherein each address entry is updated at a different frequency.

According to another general aspect, a method may include receiving a plurality of store instructions to store data in a memory system, wherein the memory system is configured to, at least temporarily, store the data in at least one cache. The method may include selecting, via a region size detection circuit, a cache to store a stream of store instructions based upon, at least in part, by tracking multiple address entries in the plurality of store instructions, wherein each address entry is updated at a different frequency.

According to another general aspect, a system may include a plurality of processors, a cache system, and a region size detection circuit. The plurality of processors, may each be configured to issue a stream of store instructions to store data in a cache system. The cache system may be configured to store data in a hierarchy of cache tiers. The region size detection circuit may be configured to determine which of the cache tiers to store the stream of store instructions based upon, at least in part, by determining if the stream of store instructions includes an iterative stream of store instructions, and the repetition size iterative stream of store instructions.

The details of one or more implementations are set forth in the accompanying drawings and the description below. Other features will be apparent from the description and drawings, and from the claims.

A system and/or method for the storage of data, and more specifically to the management of the processing of a stream of write or store instructions, substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Figure 1:
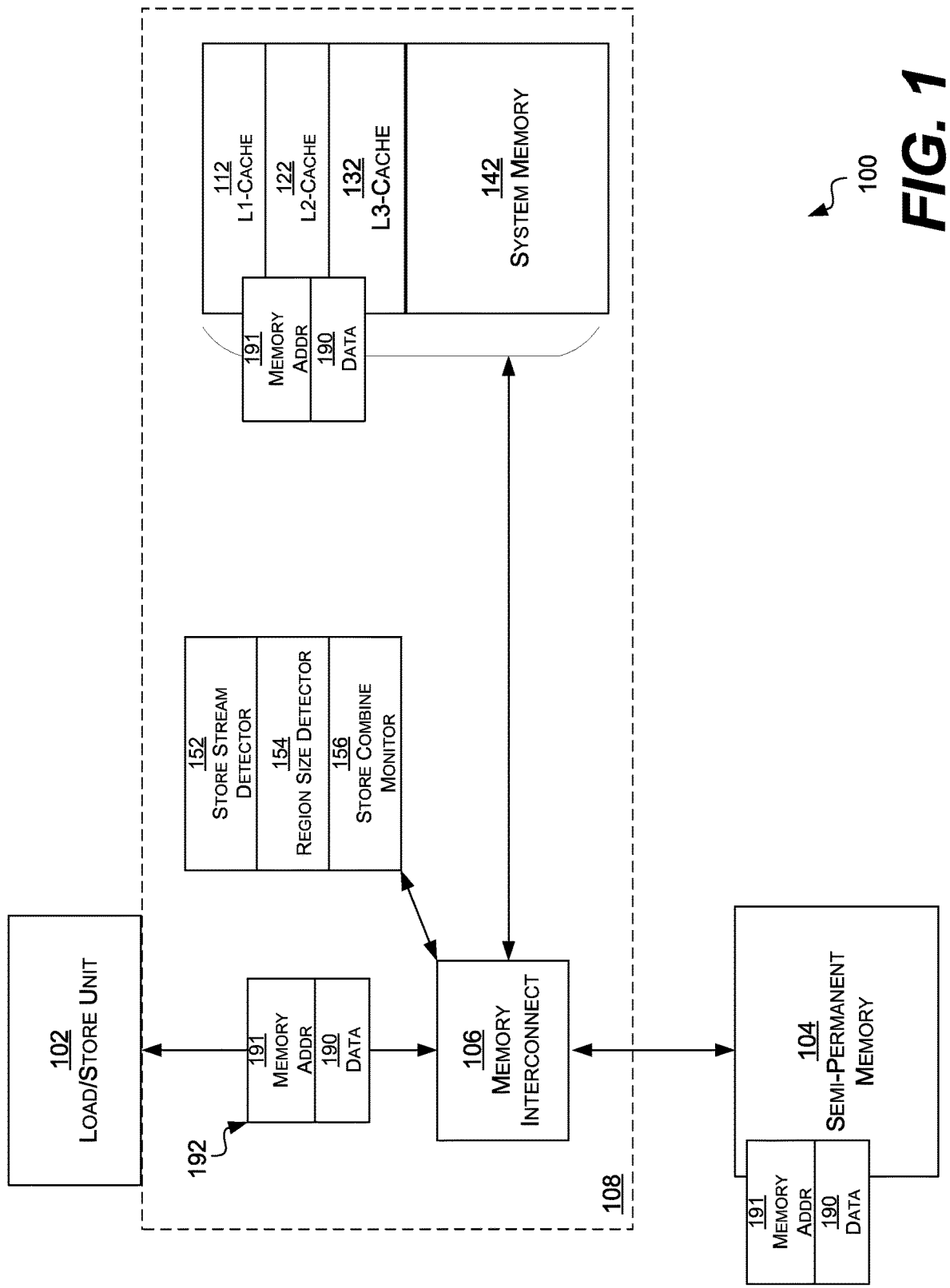
FIG. 1 is a block diagram of an example embodiment of a system in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, and so on may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

FIG. 1 is a block diagram of an example embodiment of a system 100 in accordance with the disclosed subject matter. In the illustrated embodiment, the system 100 may include a computing device, such as, for example, a laptop, desktop, workstation, personal digital assistant, smartphone, tablet, and other appropriate computers. In various embodiments, the system 100 may include an integrated circuit, such as, a microprocessor, a processor, or a system-on-a-chip (SoC). It is understood that the above are merely a few illustrative examples to which the disclosed subject matter is not limited.

In various embodiments, the system 100 may include a processor or CPU configured to execute various instructions or perform operations. In the illustrated embodiment, the system 100 may include a load/store unit (LSU) or circuit 102 configured to issue load (read) or store (write) operations. In the illustrated embodiment, store operations will be discussed. However, an embodiment may be created that focuses upon or considers load operations. It is understood that the above is merely one illustrative example to which the disclosed subject matter is not limited.

Further, the system 100 may also include a memory system 108. In the illustrated embodiment, the memory system 108 may include a plurality of memories arranged in a tiered series of caches. The tiered series of caches may include (from conceptually lowest tier to highest tier) a system memory 142 (e.g., dynamic random access memory (DRAM), NAND memory), a L3 cache 132, a L2 cache 122, and a L1 cache 112.

As described above, the memory system 108 may include a plurality of tiers of memory storage. As is understood by one skilled in the art, the tiers of a memory system generally attempt to balance speed with size. Tiers that are topologically closer or nearer to the LSU 102 are often faster but smaller than tiers that are further away (topologically) from the LSU 102 (or processor, in general). For example, an L1 cache 112 may be the closest, smallest, and fastest tier of the memory system. The L2 cache 122 may be the midway in distance from the LSU 102, smaller than the system memory 142 but larger than the L1 cache 112, and faster than the system memory 142 but slower than the L1 cache 112. Likewise, the L3 cache 132 may be between the L2 cache 122 and the system memory 142, and smaller but faster than the system memory 142. The system memory 142 may be the tier furthest away from the LSU 102 or processor, and slowest but largest of all the tiers. It is understood that the above are merely a few illustrative examples to which the disclosed subject matter is not limited.

As described above, when the size of a memory tier is limited, the choice of what to store in that tier becomes an issue. If there is a large amount to data to be stored, it is possible for the large data to crowd out other data. The cache or memory tier may effectively become monopolized (or dominated) by the large data set. If the data set will be reused, this domination of the cache may not be a problem. The data may be accessed more quickly by being in the cache. Conversely, if the data set will not be reused or used minimally, this domination of the cache can cause the cache to effectively be useless or counter-productive, as it is filled with unwanted data.

For store traffic or series of store instructions, it may be better to allocate, as is traditional, in the various cache tiers. Alternatively, sometimes it is better to bypass the one or more cache tiers and directly write to the memory (e.g., the system memory 142 or the semi-permanent memory 104). For example, it may be desirable to allocate data in certain level of cache (e.g., the L3 cache 132) and bypass upper-level caches (e.g., the L1 cache 112 and L2 cache 122). In some embodiments, stores do not write to every byte of a cache line. This is known as a partial store stream in contrast to a full store stream in which a cache line is fully written by stores. In such an embodiment, the desired choice of which cache tier to use for partial store streams may be different with that in full store steam scenario.

In various embodiments, the LSU 102 may issue a store instruction 192 or plurality of store instructions 192. In various embodiments, the store instruction 192 may include data 190 to be stored, and a memory address portion 191 that indicates the memory address at which the data 190 is to be stored. The memory address 191 may be virtual or physical and may occur in one or more, or even none of the memories of the memory system 108. In such an embodiment, as the caches store or no longer store data, the memory addresses associated with those respective cache tiers may change.

In the illustrated embodiment, the memory system 108 may include a memory interconnect 106. In such an embodiment, the memory interconnect 106 may route the store instruction 192 to a target cache tier or the semi-permanent memory 104. Traditionally, a memory interconnect 106 would route a store instruction 192 to the highest level cache (e.g., the L1 cache 112), and then allocate (loading or storing) the associated memory address 191 into the other cache tiers (e.g., the L2 cache 112) as needed.

In the illustrated embodiment, the memory interconnect 106 may consult or include the store stream detector circuit 152, the region size detector circuit 154, and/or the store combine monitor circuit 156. The store stream detector circuit 152, the region size detector circuit 154, and the store combine monitor circuit 156 may detect if a stream of stores 192 is occurring, and, if so, where to store the stream.

In the illustrated embodiment, the system 100 may include a store stream detector circuit 152. In various embodiments, the store stream detector circuit 152 may be configured to detect when a plurality of store operations 192 constitutes a stream of data store operations, or a series of store operations to a contiguous memory space. In some embodiments, this may include software hints, but, in the illustrated embodiment, the store stream detector circuit 152 may be configured to perform hardware detection of a store stream. In various embodiments, the store stream detector circuit 152 may be included in the memory system 108 (as illustrated) or, in another embodiment, LSU 102. An embodiment of the store stream detector circuit 152 is discussed in refer to FIG. 2.

The disclosed subject matter attempts to, at least in part, determine which cache tier to write a stream of store instructions to. For example, many applications iteratively write to the same memory region. If the size of the memory region is smaller than the cache size of a given tier of the cache hierarchy, it may be beneficial to allocate the streaming data in that level while bypassing upper level caches. In various embodiments of the disclosed subject matter, a method to determine the region size (and therefore the desired cache tier) of an iterative store stream is shown.

In the illustrated embodiment, the processor 100 may include a region size detector circuit 154. In various embodiments, the region size detector circuit 154 may be configured to determine a cache tier for the destination of a stream of store instructions. In some embodiments, the region size detector circuit 154 may do this, based upon, at least in part, by tracking multiple cache-line address entries in the plurality of store instructions 192, wherein each address entry is updated at a different frequency. In some embodiments, this may include selecting a cache tier that has a cache size larger than the region size of an iterative stream of store instructions. In various embodiments, the region size detector circuit 154 may be included in the memory system 108 (as illustrated) or, in another embodiment, LSU 102. An embodiment of the region size detector circuit 154 is discussed in refer to FIGS. 3 and 4.

In many applications, a store stream may write to many cache lines but not write every byte of each single cache line. This is referred to as partial store streaming (vs. full store streaming when writing full cache lines). Partial store streaming often exhibits more complicated trade-offs. The performance impact of bypassing caches for partial store streaming data is often application and/or machine specific, and may be either positive or negative depending upon the specific instance. Therefore, a method to determine whether to bypass the caches or to allocate in caches for partial store streaming is desirable.

In the illustrated embodiment, the system 100 may include a store combine monitor circuit 156. In various embodiments, the store combine monitor circuit 156 may be configured to track a number of store instructions that are combined at a cache line level of granularity, and employ the number to determine partial store streaming handling. In various embodiments, the store combine monitor circuit 156 may be included in the memory system 108 (as illustrated) or, in another embodiment, LSU 102. An embodiment of the store combine monitor circuit 156 is discussed in FIG. 5.

In various embodiments, the store stream detector circuit 152, the region size detector circuit 154, and store combine monitor circuit 156 may operate independently or orthogonally. In such an embodiment, the system 100 may include one or more of the store stream detector circuit 152, the region size detector circuit 154, and the store combine monitor circuit 156.

In various embodiments, the system 100 may include a semi-permanent memory 104. The semi-permanent memory 104 may be configured to store data in a semi-permanent manner outside the cache tiers. In such an embodiment, the semi-permanent memory 104 may store all of the data 190 in the system 100, whereas the memory system 108 then caches versions of the data 190. In various embodiments, the semi-permanent memory 104 may include a non-volatile memory, such as, for example, a hard drive or a solid-state drive. It is understood that the above are merely a few illustrative examples to which the disclosed subject matter is not limited.

Figure 2:
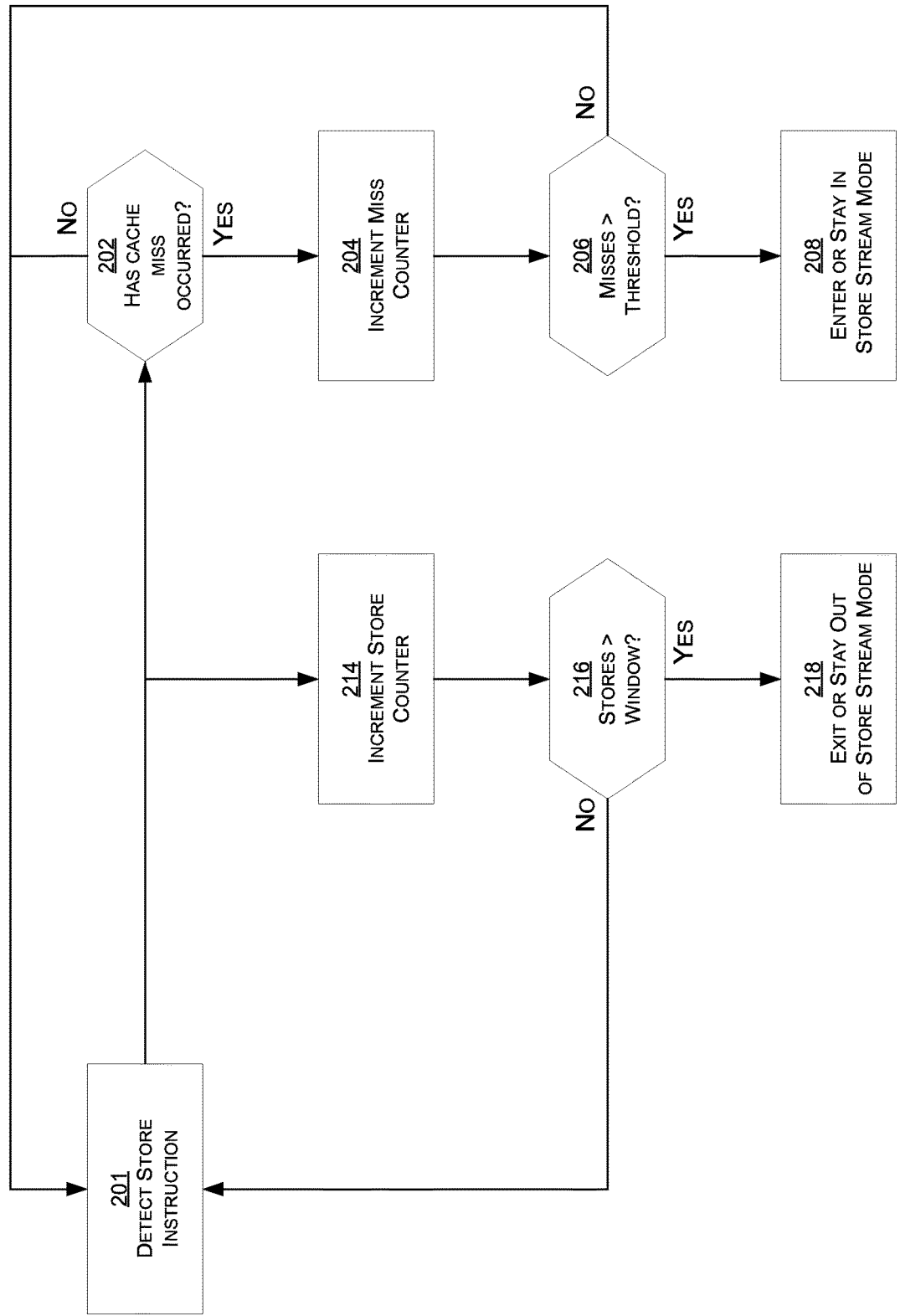
FIG. 2 is a flowchart of an example embodiment of a technique in accordance with the disclosed subject matter.

FIG. 2 is a flowchart of an example embodiment of a technique 200 in accordance with the disclosed subject matter. In various embodiments, the technique 200 may be embodied as a circuit, specifically a store stream detector circuit.

In such an embodiment, the store stream detector circuit may be configured to detect whether the memory system should enter or exit a store streaming mode. In such an embodiment, the memory system may engage the region size detector, the store combine monitor, and/or other circuits configured to process a store stream. Conversely, when the plurality of store instructions do not constitute a store stream, the memory system may handle the store instructions in an individual manner, which traditionally includes storing them in the highest cache tier and letting the data flow down to the lower cache tiers as would normally happen. It is understood that the above is merely one illustrative example to which the disclosed subject matter is not limited.

In the illustrated embodiment, the store stream detector may be configured to track the number of misses and the number of all store instructions. It may then compare them to respective threshold values, and based upon that comparison, enter or exist store streaming mode.

In the illustrated embodiment, At 201, the present store stream detector circuit detects a store instruction. At 214, the present store stream detector circuit increments a store counter value. At 202, the present store stream detector circuit determines whether a cache hit or a cache miss has occurred. If the store instruction results in a cache miss, the present store stream detector circuit increments a miss counter value. If the store instruction results in a cache hit, the miss counter may be unaffected.

In the illustrated embodiment, the store stream detector may be configured to determine if a certain number of cache misses occurs within a specified window of store instructions. If so, the memory system may enter a store streaming mode. If not, the memory system may exit a store streaming mode. In one embodiment, the window threshold may be 128 stores, and the miss threshold may be 64 misses. It is understood that the above is merely one illustrative example to which the disclosed subject matter is not limited.

At 216, the present store stream detector circuit compares the store counter value against a window threshold. At 218 if the number of current store counter value is greater than (or equal to, in some embodiments) the window threshold, the memory system may exit (or stay out of) a store stream mode. In such an embodiment, upon exiting store stream mode, the store counter value and the miss counter value may be reset to zero.

At 206, the present store stream detector circuit compares the miss counter value against a miss threshold. At 208, if a current miss counter value is greater than (or equal to, in some embodiments) the miss threshold, the memory system may enter (or stay in) store stream mode. In such an embodiment, upon entering store stream mode, the store counter value and the miss counter value may be reset to zero.

In an alternative embodiment, an accumulated size of store misses and all stores may be used instead of a count of the misses and stores. For example, if more than 256 bytes of misses occur within 512 bytes of stores, the decision to enter the store streaming mode may be made.

In various embodiments, the window threshold and the miss threshold may be dynamically adjustable, and differ based upon the exit and entry criteria. For example for purposes of entry miss/window thresholds of 256 bytes within 512 bytes may be used, but exiting store streaming mode may occur if fewer than 64 bytes of misses occur within 128 bytes of stores. This can separately control how quickly a processor enters or exits store streaming mode. It is understood that the above are merely a few illustrative examples to which the disclosed subject matter is not limited.

Figure 3:
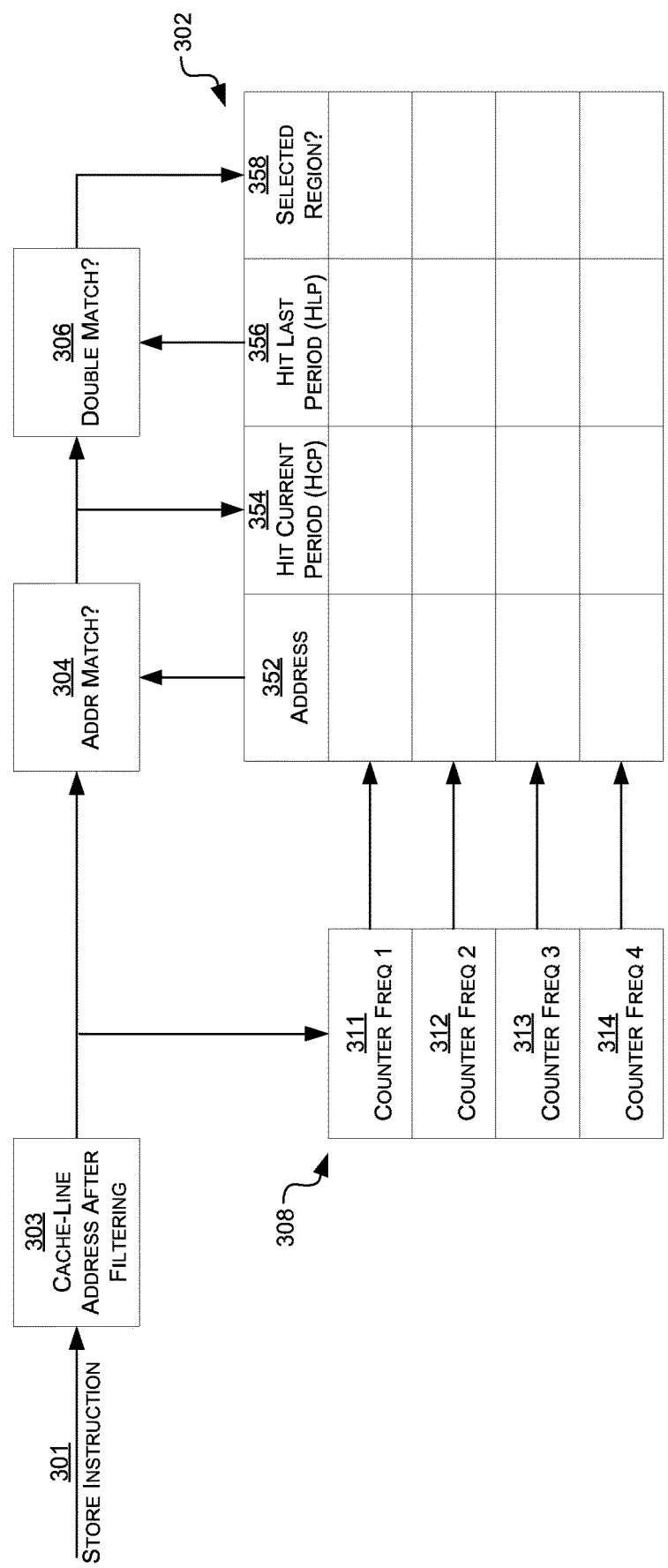
FIG. 3 is a diagram of an example embodiment of a data structure and a circuit in accordance with the disclosed subject matter.

FIG. 3 is a diagram of an example embodiment of a data structure 302 and a circuit 300 in accordance with the disclosed subject matter. In various embodiments, the data structure 302 and circuit 300 may be embodied as a circuit, specifically a region size detector circuit, as described above.

In the illustrated embodiment, the region size detector 300 may be configured to detect the region size and determine the destination or cache tier of an iterative store stream. In various embodiments, many applications iteratively write to the same memory region during a store stream. If the size of the region is larger than the cache size of certain level, it may be detrimental to allocate the data at that level. Conversely, if the region is smaller than the cache size of the next level of cache tiers, it may be beneficial to allocate the streaming data directly to that lower cache tier, skipping or bypassing the higher cache tier.

In the illustrated embodiment, the region size detector 300 may be configured to monitor what memory addresses are being written to, and determine if the same address(es) are being written to again and again. The region size detector 300 may be configured to do this at a plurality of frequencies, such that different periods of repetition are detected or monitored. In some embodiments, these frequencies may be associated with the cache sizes of the various cache tiers. In such an embodiment, the region size detector 300 may determine which cache size most closely matches the repetitive period of the store stream.

In the illustrated embodiment, an address entry table 302 may be employed to track the memory addresses (in address entries) and their repetition (or lack thereof). In such an embodiment, the address entry table 302 may include a number of address entries or rows that are each updated at a given frequency. Each address entry may include a recent address field 352 configured to store a most recent cache-line address sampled at a start of a current period, a current period flag 354 configured to indicate if the most recent address has occurred within the plurality of store instructions at least a second time within the current period, and a last period flag 356 configured to indicate a value of the current period flag at an end of a last period. In some embodiments, the address entry table 302 may also include a selected region field 358 to indicate which region that current store stream is best suited for. Although, it is understood that the above is merely one illustrative example to which the disclosed subject matter is not limited.

In one embodiment, a store instruction 301 occurs. The memory address of the store instruction goes through an address filter 303, which combines store instructions at cache-line granularity. Therefore, if there are multiple store instructions accessing the same cache line in a short period of time, only one cache-line address may come out of the address filter 303. In the illustrated embodiment, the region size detector 300 may include a plurality of counters 311, 312, 313, and 314 (collectively counters 308) that count the accumulated size of cache lines accessed by store instructions and determine if the correct value of accumulated size has occurred since the last accounting period. As described in more detail in reference to FIG. 4, each counter and address entry may be associated with a particular frequency or accumulated size (e.g., 512 bytes, 64 bytes). Other embodiments may count store instructions or number of cache lines for these counters instead.

Once the frequency event has been reached or upon the first store instruction, the cache-line address may be stored in the address field 352. Thereafter, as each cache-line address occurs, the cache-line address may be compared to the cache-line address in the address field 352. This may be done by comparator circuit 304. If the two addresses (the current and the most recently sampled) match, a hit within the current period flag ($H_{CP}$) 354 is set. Other embodiments may perform the comparison only on store instructions that miss in the cache.

At the end of each period, the $H_{CP}$ 354 may be copied to the Hit with last period ($H_{LP}$) flag 356. And, this $H_{CP}$ flag 354 may be reset. During the new period the $H_{CP}$ flag 354 may become set if the new sampled address 352 is the same as the latest address in the store instruction.

If the $H_{CP}$ flag 354 and the $H_{LP}$ flag 356 ever become set at the same time, it indicates that the same address has been seen within two consecutive periods, and the size of the iterative store stream has been detected. This may be determined by the comparator circuit 306. In such an embodiment, the cache tier associated with the address entry or frequency may be selected and the store stream may be directed to that cache tier.

Figure 4:
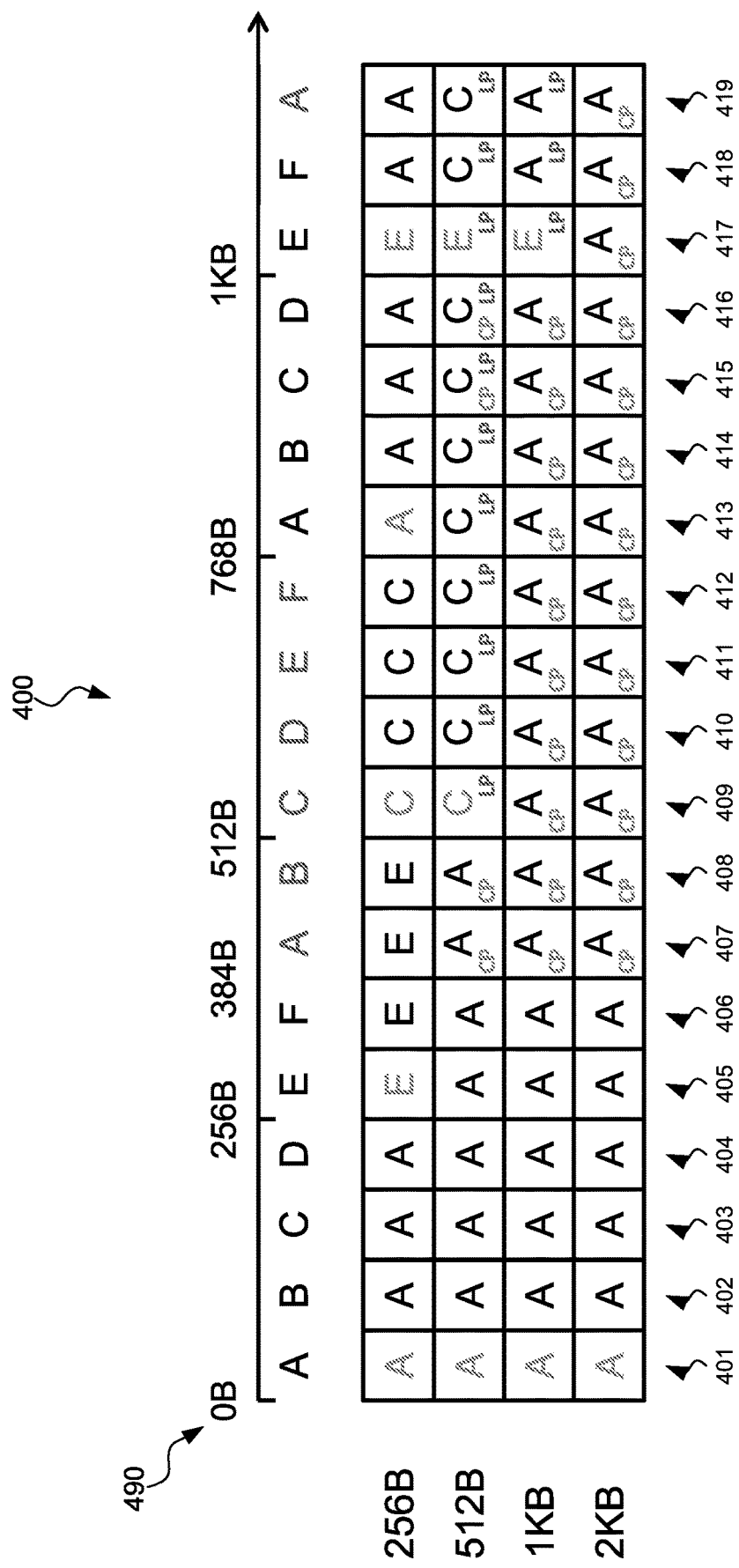
FIG. 4 is a block diagram of an example embodiment of a data structure in accordance with the disclosed subject matter.

FIG. 4 is a block diagram of an example embodiment of a data structure 400 in accordance with the disclosed subject matter. In the illustrated embodiment, an example of the workings of a region size detector is shown. It is understood that the above is merely one illustrative example to which the disclosed subject matter is not limited.

In the illustrated embodiment, four address entries are employed; although, more or less entries may be used. In the illustrated embodiment, the address entries are sampled at frequencies of 256 bytes (B), 512 bytes, 1 kilobyte (KB), and 2 kilobytes. It is understood that the above are merely a few illustrative examples to which the disclosed subject matter is not limited.

In the illustrated embodiment, a store stream 490 includes 6 store instructions to 6 different cache-line addresses A, B, C, D, E, and F. These store instructions repeat (at least address-wise) every 384 bytes (i.e., 6 cache lines with 64-byte cache lines). In the illustrated embodiment, the store stream 490 repeats 3⅙ times, but the store stream 490 may continue to repeat after the illustrated portion occurs. It is understood that the above are merely a few illustrative examples to which the disclosed subject matter is not limited.

In the illustrated embodiment, at instruction 401, as the initial store instruction and cache-line address, all address entries (e.g., 256 B, 512 B, 1 KB, 2 KB) sample the initial address A. The Address A is placed in the respective recent address fields of the address entry table.

At instruction 402, the new cache-line address (address B) is compared to most recently sampled address (address A). In this case, the two addresses do not match and the $H_{CP}$ flag for each address entry or frequency remains cleared. The same thing occurs at instructions 403 and 404, but with new addresses C and D being compared to sampled address A.

At instruction 405, the 256 B period for the first address entry is reached and its recent address field is now sampled to be address E. The second, third, and fourth address entries have not yet reached their respective sampling frequencies, and their recent address field remain address A.

Instruction 406 (address F) occurs very similarly to that of instructions 402, 403, and 404. Instruction 407, however, marks the initial repeat of the store stream with address A returning. For the first address entry the current address A is compared to the sampled address E, which does not match. However, for the second, third, and fourth address entries, the current address A is compared to the sampled address A, which does match. As a result their respective $H_{CP}$ flags become set, indicating that the store stream repeats within their frequencies or periods.

Instruction 408 (address B) occurs very similarly to that of instruction 406. However, even though current address B does not match the sampled address A, the $H_{CP}$ flag remains set or is sticky for the second, third, and fourth address entries.

Instruction 409 (address C) occurs at the $512^{th}$ byte. This instruction aligns with the periods of the first and second address entries (256 B and 512 B), and the current address C is sampled into their recent address fields. The recent address fields of the third and fourth address entries remain address A. The $H_{CP}$ flag of the first address entry (which is clear) and the second address entry (which is set) are copied to their $H_{LP}$ flags. Their $H_{CP}$ flags are then cleared. The $H_{CP}$ flags and $H_{LP}$ flags of the third and fourth address entries remain unchanged as their respective periods have not been reached.

Instructions 410, 411, and 412 (addresses D, E, and F) occur similarly to instructions 402, 403, and 404. Instruction 413 (address A) occurs similarly to instruction 407, but the new sampled address for the first address entry is now address A. Instruction 414 (address B) occurs similarly to instruction 402.

Instruction 415 (address C) occurs similarly to instruction 414 from the viewpoint of the first, third, and fourth address entries. However, the second address entry current has sampled address C and, therefore, a comparison of the current and sample addresses match (similarly to instruction 407). The second address entry sets its $H_{CP}$ flag.

At instruction 415, the second address entry has both its $H_{CP}$ flag and $H_{LP}$ flag set. This means the region size has been detected as falling between the 256 B and 512 B boundaries. If, as in this embodiment, the second address entry is associated with the second cache tier, the store stream 490 may be directed to the second cache tier. The first cache tier may be skipped.

Instruction 416 (address D) may occur similarly to instruction 414, although the store stream 490 may be directed to the second cache tier. Instruction 417 (address E) may be similar to instruction 409, except that the third address entry's frequency boundary (1 KB) may be met and the current address sampled, and flags copied and cleared. Instructions 418 and 419 (addresses F and A) may occur similarly to instruction 413. In such an embodiment, the store stream 490 may still be directed to the second cache tier, until a new cache tier is selected.

In various embodiments, multiple cache tiers may match the region size. For example, the interactive store stream may repeat on exactly a cache size boundary, and two cache sizes may be multiples of each other, such that a match occurs every period for a smaller frequency address entry and every other period for a larger frequency address entry. In such an embodiment, the cache tier associated with the smaller frequency address entry may be selected as the store stream's destination or target. It is understood that the above is merely one illustrative example to which the disclosed subject matter is not limited.

In various embodiments, each tracking entry may only track one address in a period, which could be sensitive to noise. In some embodiments, this can be improved by employing multiple instances of the tracking structures. For example, two entries are both updated every 64 KB, but there is a, for example, 1 KB offset between their update points. While in a training state, the region size detector may enter the detected state only when both entries suggest a region is detected. While in the detected state, the region size detector may exit only when both entries suggest no address repetition is seen in the past period.

Figure 5:
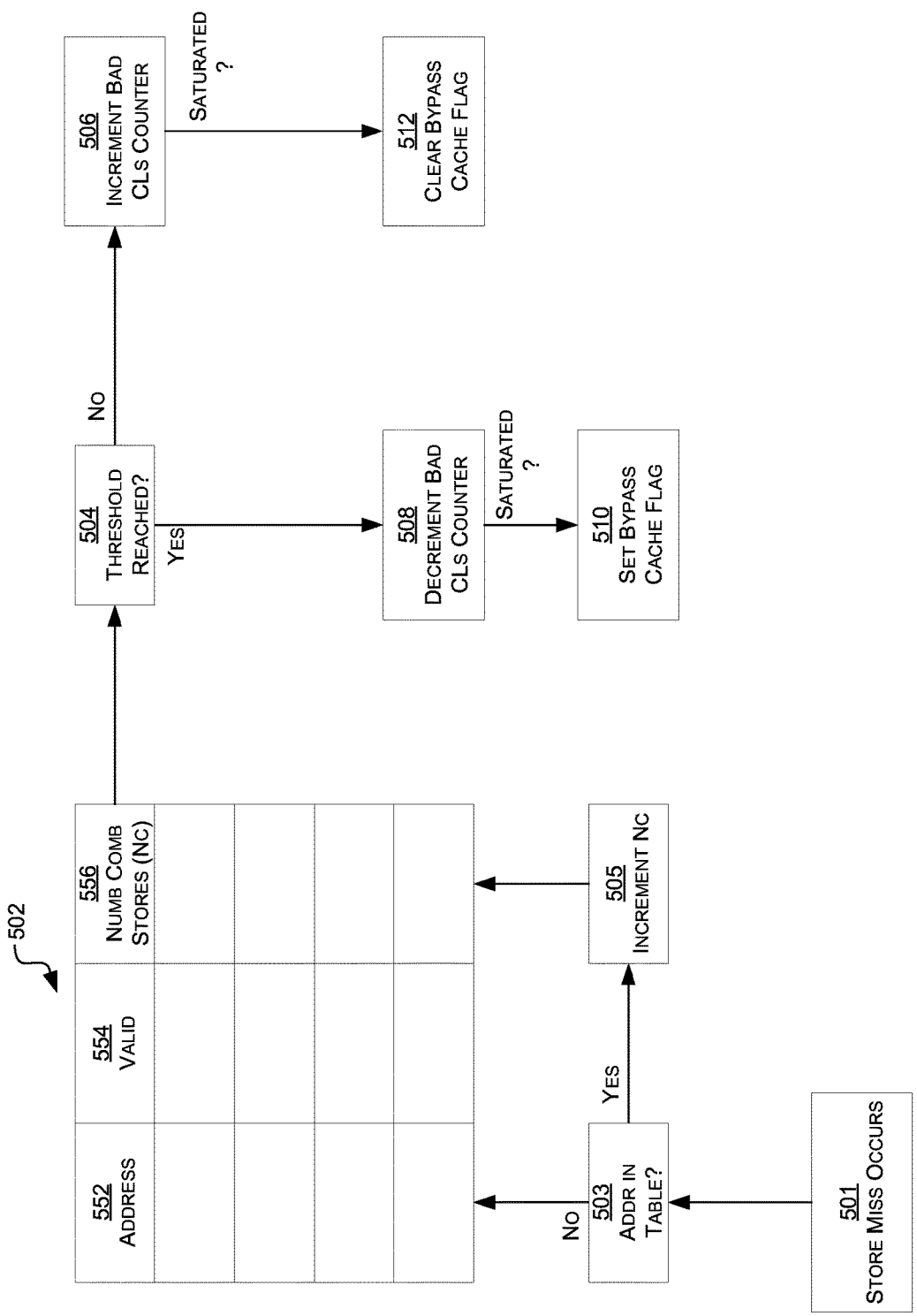
FIG. 5 is a diagram of an example embodiment of a data structure and a circuit in accordance with the disclosed subject matter.

FIG. 5 is a diagram of an example embodiment of a data structure 502 and a circuit 500 in accordance with the disclosed subject matter. In various embodiments, the data structure 502 and circuit 500 may be embodied as a circuit, specifically a store combine monitor circuit, as described above.

In various embodiments, the store combine monitor 500 may be configured to characterize and manage the handling of partial store streaming, that is, streaming that writes to less than a full cache line. Occasionally, store streams stream to the semi-permanent memory or to a non-volatile cache tier. This target memory is frequently a solid state device that must write a full cache line at a time. When only a partial cache line needs to be written this requires a read-modify-write operation. In such an operation, the full cache line is read, then modified with the new data, and then written back as a full cache line. This tends to increase the overhead of a store operation significantly and hence is the reason why sometimes directly streaming to memory can have negative impact on performance. The store combine monitor 500 may be configured to track the number of stores combined per cache line, and determine if the store stream should use a target cache tier with less of an overhead (i.e., one that does not require an immediate read-modify-write operation).

In various embodiments, the key characteristic to determine the most advantageous way to handle partial store streams is to track the number of stores combined ($N_C$) for each cache line. In one embodiment, if most cache lines have their $N_C$ below a threshold value ($N_{CTH}$), i.e., frequently the combinations are relatively sparse, it may be desirable to let the store stream be allocated into the cache instead of being directly written to memory. Otherwise, it may be desirable to let the store stream skip the caches and directly be written to memory.

The handling of partial store streams is often more expensive than full store streams, since it requires a read-modify-write. Therefore, each transaction (i.e. writing a partial cache-line to memory) typically requires more resources, e.g., bandwidth, read-write turnaround, queuing & buffering. A sparse partial store stream indicates that the number of transactions per instruction is relatively high. Therefore, allocating streaming data to a cache tier that doesn't use the read-modify-write operation (i.e., natively allows partial cache line writes) decouples reads from writes. In such an embodiment, the stored data may eventually be written back to the semi-permanent or non-volatile lower cache tier in time as the normal cache system eviction, write-back operations are performed. This either avoids the partial cache line write (as the cache line has been combined in the higher cache tier) or delays the partial write to a later time (on cache eviction), therefore spreading any additional resource usage requirements over a long time period.

In the illustrated embodiment, the store combine monitor 500 may include a tracking table 502 configured to track the number of combined stores per cache line. In the illustrated embodiment, the tracking table 502 may include, per row or entry, an address or cache line field 552 that identifies a region of addresses associated with a cache line or the cache line directly, and a number of combined stores count field 556 that identifies the number of times this cache line has experienced a combining store. In some embodiments, the table 502 may also include a valid field 554 that indicates if the cache line includes valid data, and if not the entry may be evicted from the table 502. It is understood that the above are merely a few illustrative examples to which the disclosed subject matter is not limited.

At 501, the present store combine monitor detects a store miss. In one embodiment, a determination may be (e.g., via comparator 503) made if the address or cache line associated with the store miss is already included in the table 502. If not, a new entry for the address may be created in the table 502. In some embodiments, the entry may be created with an initial $N_C$ 556 of 0. In another embodiment, the entry may be created with an initial $N_C$ 556 of 1. If the entry already exists the $N_C$ 556 may be incremented by 1 (as shown by counter 505).

Comparator circuit 504 illustrates that a determination may be made as to whether or not the store miss's $N_C$ 556 is more than (or equal to) a combined threshold value ($N_{CTH}$). If the cache line has experienced more than (or equal to) the threshold amount of combined stores, a bad cache line (CL) counter may be decremented (as shown by circuit 508). Conversely, if the cache line has experienced less than the threshold amount of combined stores, a bad cache line (CL) counter may be incremented (as shown by circuit 506). The bad cache line counter may monitor how much of the cache tier is subjected to the read-modify-write operation. In various embodiments, the bad cache line counter may be a saturating counter, both in terms of the maximum and minimum values. In one such an embodiment with a 3-bit counter, the maximum value may be 7 and the minimum value may be 0. It is understood that the above is merely one illustrative example to which the disclosed subject matter is not limited.

In the illustrated embodiment, if the bad cache line counter saturates at its minimum value, a bypass cache flag may be set (shown by memory 510). When such a flag is set (or signal sent) the store stream may bypass the cache and be written to memory. Conversely, in one embodiment, if the bad cache line counter saturates at its maximum value, the bypass cache flag may be cleared (shown by memory 512), and the store stream may be stored in the cache. It is understood that the above are merely a few illustrative examples to which the disclosed subject matter is not limited.

While the disclosed subject matter has been discussed as occurring for the entire memory system, in various embodiments, the store stream detector, region size detector, and/or the store combine monitor may operate on a sub-set of the memory system. For example the circuits may operate on a per-stream basis, or only for certain memory addresses. In the case of a multi-processor or multi-LSU system, the circuits may operate only for a sub-set of the multi-processors. It is understood that the above are merely a few illustrative examples to which the disclosed subject matter is not limited.

Figure 6:
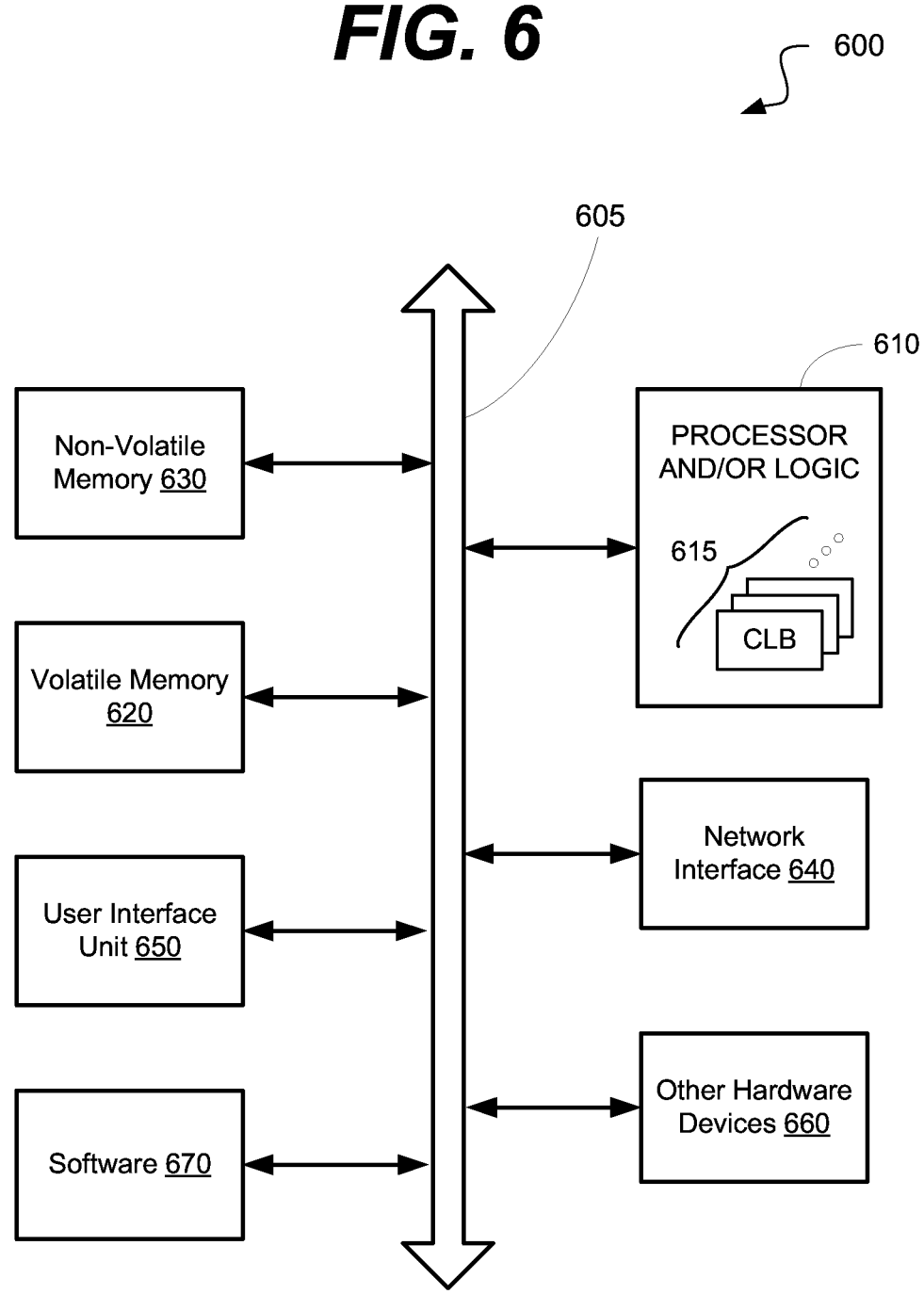
FIG. 6 is a schematic block diagram of an information processing system that may include devices formed according to principles of the disclosed subject matter.

FIG. 6 is a schematic block diagram of an information processing system 600, which may include semiconductor devices formed according to principles of the disclosed subject matter.

Referring to FIG. 6, an information processing system 600 may include one or more of devices constructed according to the principles of the disclosed subject matter. In another embodiment, the information processing system 600 may employ or execute one or more techniques according to the principles of the disclosed subject matter.

In various embodiments, the information processing system 600 may include a computing device, such as, for example, a laptop, desktop, workstation, server, blade server, personal digital assistant, smartphone, tablet, and other appropriate computers, and so on or a virtual machine or virtual computing device thereof. In various embodiments, the information processing system 600 may be used by a user (not shown).

The information processing system 600 according to the disclosed subject matter may further include a central processing unit (CPU), logic, or processor 610. In some embodiments, the processor 610 may include one or more functional unit blocks (FUBs) or combinational logic blocks (CLBs) 615. In such an embodiment, a combinational logic block may include various Boolean logic operations (e.g., NAND, NOR, NOT, XOR, and so on), stabilizing logic devices (e.g., flip-flops, latches, and so on), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 600 according to the disclosed subject matter may further include a volatile memory 620 (e.g., a Random Access Memory (RAM), and so on). The information processing system 600 according to the disclosed subject matter may further include a non-volatile memory 630 (e.g., a hard drive, an optical memory, a NAND or Flash memory, and so on). In some embodiments, either the volatile memory 620, the non-volatile memory 630, or a combination or portions thereof may be referred to as a "storage medium". In various embodiments, the volatile memory 620 and/or the non-volatile memory 630 may be configured to store data in a semi-permanent or substantially permanent form.

In various embodiments, the information processing system 600 may include one or more network interfaces 640 configured to allow the information processing system 600 to be part of and communicate via a communications network. Examples of a Wi-Fi protocol may include, but are not limited to, Institute of Electrical and Electronics Engineers (IEEE) 802.11g, IEEE 802.11n, and so on. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), and so on. Examples of a wired protocol may include, but are not limited to, IEEE 802.3 (a.k.a. Ethernet), Fibre Channel, Power Line communication (e.g., HomePlug, IEEE 1901, and so on), and so on. It is understood that the above are merely a few illustrative examples to which the disclosed subject matter is not limited.

The information processing system 600 according to the disclosed subject matter may further include a user interface unit 650 (e.g., a display adapter, a haptic interface, a human interface device, and so on). In various embodiments, this user interface unit 650 may be configured to either receive input from a user and/or provide output to a user. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

In various embodiments, the information processing system 600 may include one or more other devices or hardware components 660 (e.g., a display or monitor, a keyboard, a mouse, a camera, a fingerprint reader, a video processor, and so on). It is understood that the above are merely a few illustrative examples to which the disclosed subject matter is not limited.

The information processing system 600 according to the disclosed subject matter may further include one or more system buses 605. In such an embodiment, the system bus 605 may be configured to communicatively couple the processor 610, the volatile memory 620, the non-volatile memory 630, the network interface 640, the user interface unit 650, and one or more hardware components 660. Data processed by the processor 610 or data inputted from outside of the non-volatile memory 630 may be stored in either the non-volatile memory 630 or the volatile memory 620.

In various embodiments, the information processing system 600 may include or execute one or more software components 670. In some embodiments, the software components 670 may include an operating system (OS) and/or an application. In some embodiments, the OS may be configured to provide one or more services to an application and manage or act as an intermediary between the application and the various hardware components (e.g., the processor 610, a network interface 640, and so on) of the information processing system 600. In such an embodiment, the information processing system 600 may include one or more native applications, which may be installed locally (e.g., within the non-volatile memory 630, and so on) and configured to be executed directly by the processor 610 and directly interact with the OS. In such an embodiment, the native applications may include pre-compiled machine executable code. In some embodiments, the native applications may include a script interpreter (e.g., C shell (csh), AppleScript, AutoHotkey, and so on) or a virtual execution machine (VM) (e.g., the Java Virtual Machine, the Microsoft Common Language Runtime, and so on) that are configured to translate source or object code into executable code which is then executed by the processor 610.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive, and so on). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus comprising:
   a store circuit configured to issue a plurality of store instructions to store data in a memory system; and
   a region size detection circuit configured to determine a cache, from within a cache system of a processor that includes a plurality of caches, to store data associated with a stream of store instructions based upon, at least in part, by tracking multiple cache-line address entries associated with the plurality of store instructions, wherein each respective cache-line address entry is updated at a frequency based, at least in part, upon a size of a cache associated with a respective cache-line address entry and a number associated with the plurality of store instructions, wherein the region size detection circuit comprises an address entry table having the multiple cache-line entries.

2. The apparatus of claim 1, wherein the region size detection circuit is configured to:
   detect a repetition period of writes to a range of memory addresses, and
   determine the cache to store the data based, at least in part, upon the repetition period compared to a size of the cache.

3. The apparatus of claim 1, wherein each cache-line address entry comprises:
   a recent address field configured to store a most recent address sampled at a start of a current period,
   a current period flag configured to indicate if the most recent address has occurred within the plurality of store instructions at least a second time within the current period, and
   a last period flag configured to indicate a value of the current period flag at an end of a last period.

4. The apparatus of claim 1, wherein the region size detection circuit is configured to select the cache to store the stream of store instructions based upon which address entry, if any, indicates that an address match has occurred within two consecutive tracked periods, and wherein the region size detection circuit is configured to select a cache by skipping over a higher (topologically) cache.

5. The apparatus of claim 1, further comprising:
   a store stream detection circuit configured to detect if the plurality of store instructions comprises a stream of store instructions based, at least in part, upon a number of cache hits to a selected cache, and a size of the store instructions.

6. The apparatus of claim 1, further comprising:
   a store combine monitor circuit configured to track a number of store instructions that are combined at a cache line level of granularity, and employ the number to determine partial store streaming handling.

7. The apparatus of claim 6, further comprising a semi-permanent memory configured to at least semi-permanently store data that is at least partially and temporarily stored in at least one cache; and
   wherein the store combine monitor circuit is configured to determine if the stream of store instructions will be directly stored in a cache or the semi-permanent memory based, at least in part, upon if a number of sparse cache lines associated with the stream of store instructions is below a threshold value.

8. The apparatus of claim 6, wherein the store combine monitor circuit comprises:
   a first-in-first-out address buffer configured to track how many stores are combined into each cache line.

9. The apparatus of claim 6, wherein the store combine monitor circuit comprises:
   a saturating counter configured to indicate a number of times a cache line has exceeded threshold value.

10. The apparatus of claim 1, wherein the region size detection circuit is configured to update at least two address entries at a frequency based upon a same number of bytes, but at a different offset.

11. A method comprising:
   receiving a plurality of store instructions to store data in a memory system of a processor, wherein the memory system is configured to, at least temporarily, store the data in at least one cache; and
   selecting, via a region size detection circuit, a cache within a tiered cache system of the memory system of the processor to store the data associated with a stream of store instructions based upon, at least in part, by tracking multiple address entries associated with the plurality of store instructions, wherein each address entry is updated at a frequency based, at least in part, upon a number of store instructions, wherein the region size detection circuit comprises an address entry table having the multiple address entries.

12. The method of claim 11, wherein the region size detection circuit is configured to:

detect a repetition period of writes to a range of memory addresses, and determine the cache to store the data based, at least in part, upon the repetition period compared to a size of the cache.

13. The method of claim 11, wherein each address entry comprises:
   a recent address field configured to store a most recent address sampled at a start of a current period,
   a current period flag configured to indicate if the most recent address has occurred within the plurality of store instructions at least a second time within the current period, and
   a last period flag configured to indicate a value of the current period flag at an end of a last period.

14. The method of claim 11, wherein selecting the cache to store the stream of store instructions is based upon which address entry, if any, indicates that an address match has occurred within two consecutive tracked periods.

15. The method of claim 11, further comprising:
   detecting, via a store stream detection circuit, if the plurality of store instructions comprises a stream of store instructions based, at least in part, upon a number of cache hits to a selected cache, and a size of the store instructions.

16. The method of claim 11, further comprising:
   tracking, via a store combine monitor circuit, a number of store instructions that are combined at a cache line level of granularity, and employ the number to determine partial store streaming handling.

17. The method of claim 16, further comprising:
   determining if the stream of store instructions will be directly stored in a cache or a semi-permanent memory based, at least in part, upon if a number of sparse cache lines associated with the stream of store instructions is below a threshold value.

18. The method of claim 16, wherein the store combine monitor circuit comprises:
   a first-in-first-out address buffer configured to track how many stores are combined into each cache line.

19. The method of claim 16, wherein the store combine monitor circuit comprises:
   a saturating counter configured to indicate a number of times a cache line has exceeded threshold value.

20. The method of claim 11, further comprising:
   updating at least two address entries at a frequency based upon a same number of bytes, but at a different offset.

* * * * *